United States Patent [19]

Budzich et al.

[11] 4,342,386
[45] Aug. 3, 1982

[54] ARTICLE DISTRIBUTING APPARATUS

[75] Inventors: Mieczyslaw Budzich, Forest G. Fitz, both of Lexington, Harold S. Moss, of Columbia, all of S.C.

[73] Assignee: Nassau Recycle Corp., Staten Island, New York, N.Y.

[21] Appl. No.: 104,613

[22] Filed: Dec. 17, 1979

[51] Int. Cl.³ ............................................. B65G 47/66
[52] U.S. Cl. .................................. 198/360; 193/31 R; 198/442; 198/535
[58] Field of Search ............... 198/356, 358, 359, 360, 198/361, 367, 371, 436, 437, 442, 457, 535, 560, 562, 539, 369; 414/745, 748; 209/655, 657; 271/302, 303, 305; 193/31 R

[56] References Cited
U.S. PATENT DOCUMENTS 2,835,374  5/1958  Engels et al. .
3,056,482  10/1962  Lanham et al. .................. 198/437 X
3,251,450  5/1966  De Ridder .......................... 198/535
3,581,892  6/1971  Aro .
3,782,540  1/1974  Moselt .
4,222,478  9/1980  Gasser ............................ 198/360 X

FOREIGN PATENT DOCUMENTS 2103467  8/1971  Fed. Rep. of Germany ...... 271/302
 489702  1/1976  U.S.S.R. ............................ 198/360

Primary Examiner—Jeffrey V. Nase

[57] ABSTRACT

Apparatus is disclosed for distributing articles 90 comprising a conveyor 26 having a set of mutually spaced rollers 28 from which a ramp 30 upwardly inclines. An array of mutually spaced bars 34 is aligned between the rollers 28 and a cylinder 40 provided for raising and lowering the array of bars. A conveyor 10 is also provided for successively feeding articles 90 onto the ramp 30.

8 Claims, 5 Drawing Figures

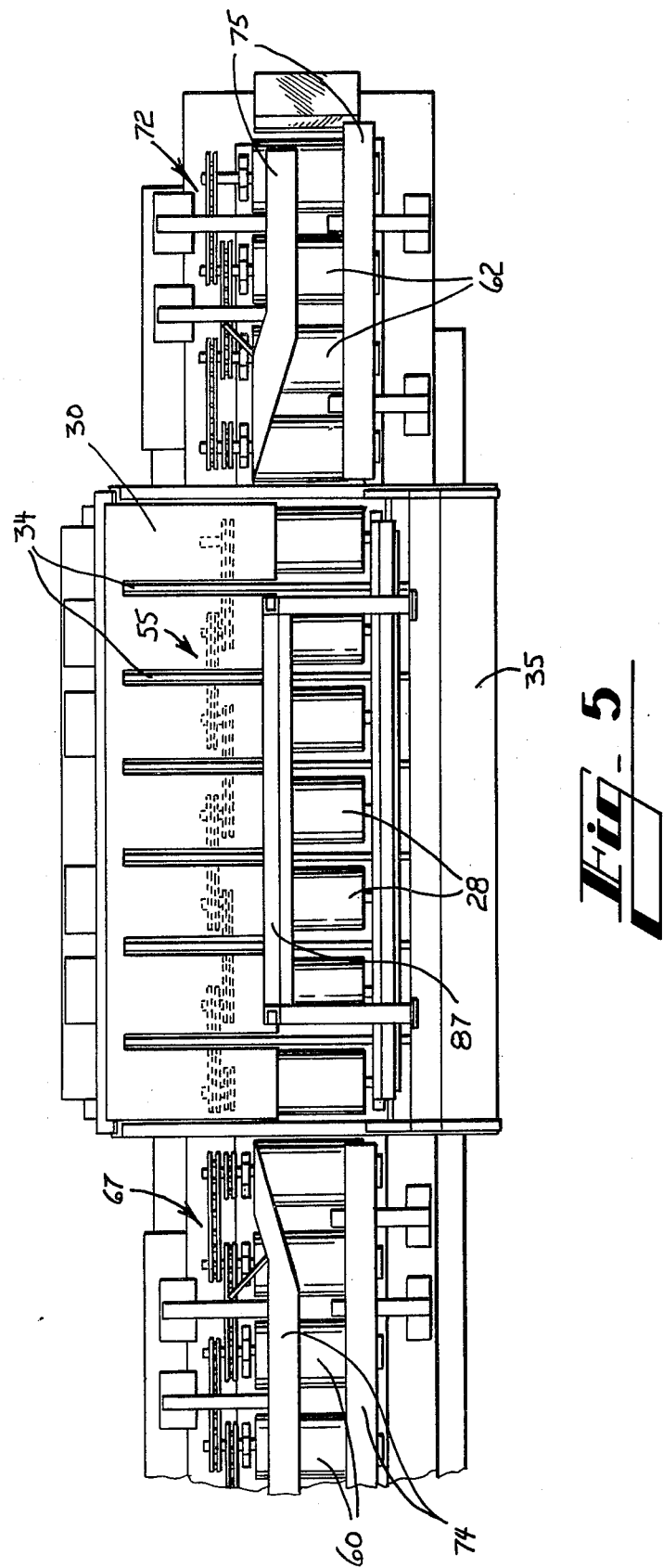

ARTICLE DISTRIBUTING APPARATUS

TECHNICAL FIELD

This invention relates to apparatuses for distributing articles being successively moved along a conveyor.

BACKGROUND OF THE INVENTION

Conveyors today find wide usage in conveying articles successively from one location to another. With some conveyor systems the regularity of article timing, spacing and orientation, and of individual article condition or quality, is of little importance during conveyance since ultimately the articles are collected in gross at a delivery station. With other conveyor systems, however, more control and order is necessary to insure that only articles of an acceptable grade or quality are conveyed to a delivery station or that some degree of regularity be maintained. For example, in some cases quality control examinations are conducted while the articles are on a conveyor with only those articles passing examination being immediately packaged upon delivery from the conveyor. In other cases articles are collected at a delivery station in a preselected arrangement as in a stack upon a pallet. In still other cases a selected orientation of the articles on the conveyor itself must be maintained since otherwise the articles may jam the conveyor or even fall from it. In such situations apparatuses can be devised using sensors and movable baffles and the like to assure that a proper article spacing and orientation be maintained. These apparatuses however can be costly, complex and unreliable. Furthermore, where the conveyor extends a substantial distance, or is comprised of several independent sections, such article spacing and orienting apparatuses must often be duplicated at several points along the conveyor line.

One manner in which the just described problem can be alleviated is to incorporate into the conveyor system a distribution station where articles may be selectively removed from a conveyor rather than be relocated and oriented with respect to adjacent articles. Exemplary of article distributors are those apparatuses disclosed in U.S. Pat. Nos. 3,581,892 and 3,782,540. With these types of distributors a section of the conveyor itself is made pivotal. By pivoting the section between raised and lowered positions articles may be selectively dropped from that conveyor onto another, or grouped together.

Though suitable in certain applications, the sectional displacement approach is not always feasible. For example, sometimes it it is impractical to provide the constant surveilance necessary to initiate quick action. In other words a slow response time is desired to enable an observer to perform other work simultaneously. The continual movement of a section of the conveyor itself also leads to maintenance and reliability problems. Furthermore, where the articles are quite rugged and heavy the reliability and ruggedness versus quick response requirements presents a distinct dilemma in designing the movable conveyor section. It thus would be desirable to provide article distributing apparatus for distributing articles being successively moved along a conveyor without a section of the conveyor itself having to be rendered temporarily disjoined from the conveyor line.

SUMMARY OF THE INVENTION

In one form of the invention apparatus is provided for distributing articles comprising a conveyor having a set of mutually spaced rollers and a ramp inclined upwardly from the rollers. An array of mutually spaced bars is aligned between the rollers. Means are provided for raising and lowering the array of bars between a lowered position beneath the rollers and a lower portion of the ramp and a raised position above the rollers and the lower portion of the ramp. Means are also provided for successively gravity feeding articles onto the ramp.

In another preferred form of the invention apparatus is provided for distributing articles which comprises a ramp and first conveyor means for conveying articles successively onto an upper portion of the ramp. Second conveyor means are also provided comprised of a succession of mutually spaced article drive members located adjacent a lower end of the ramp for conveying articles successively away from the ramp. Deflector means comprised of a set of mutually spaced bars are mounted for movement between raised and lowered positions between the second conveyor article drive members for successively deflecting articles from the ramp over the second conveyor means with the bars located in the raised position.

BRIEF DESCRIPTION OF THE DRAWING

FIG. 5 is a plan view of the apparatus shown in FIG. 1.

DETAILED DESCRIPTION

Figure 1:
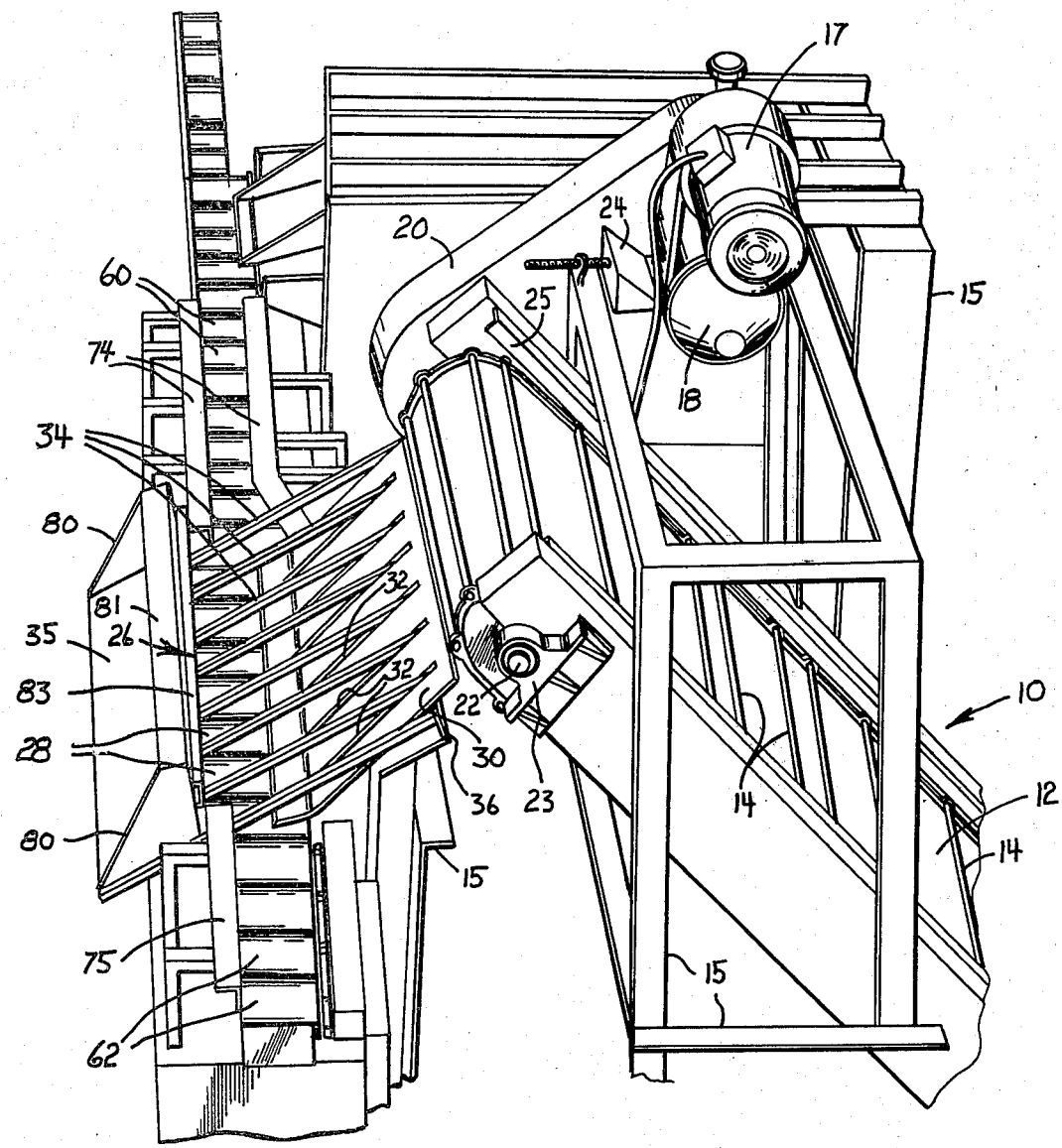
FIG. 1 is a perspective view of article distributing apparatus embodying principles of the invention in one preferred form.

Referring now in more detail to the drawing, there is shown article distributing apparatus which comprises a conveyor 10 mounted along an incline to a frame 15. The conveyor has an endless metallic belt 12 to which a set of mutually spaced cleats 14 is affixed. A motor 17 is mounted to frame 15 for driving the cleated belt 12 through a gear box 18 and an unshown chain located beneath chain drive guard 20 which drives a shaft 22 mounted within bearings of a pillow block 23. The chain is adjustable by means of a conventional chain tensioning adjustment mechanism 24. Guide rails 25 are mounted to frame 15 to each side of the path of travel of the conveyor belt 12.

The apparatus comprises another conveyor shown generally as 26 that operates independently from conveyor 10. The conveyor 26 has a set of rollers 28 mutually spaced along a horizontal plane from which a ramp 30 extends upwardly along an incline to a position beneath the uppermost portion of the conveyor 10. This ramp is provided with a series of mutually spaced, parallel slots 32 which are aligned with the spaces between the conveyor rollers 28. A set or array of mutually spaced and parallel article deflection bars 34 extends from a plate 35 through the roller spaces and the ramp slots and its sides to a plate assembly 36 located beneath the ramp. The lower plate 35 is pivotably mounted to the frame 15 by means of a pillow block 37 and pivot pin 38. The upper plate assembly 36 is pivotably mounted to a cylinder 40 by means of a clevis pin 42 supported on a clevis 43 secured to the end of the cylinder rod 44. The cylinder itself is pivotably mounted to a clevis 46 with a clevis pin 47 which all is supported upon the frame. With this arrangement it is seen that the set of bars 34 may be moved by actuation of the cylinder 40 between the bars lowered position shown in FIG. 2 and the bars raised position shown in FIGS. 1 and 3.

Figure 3:
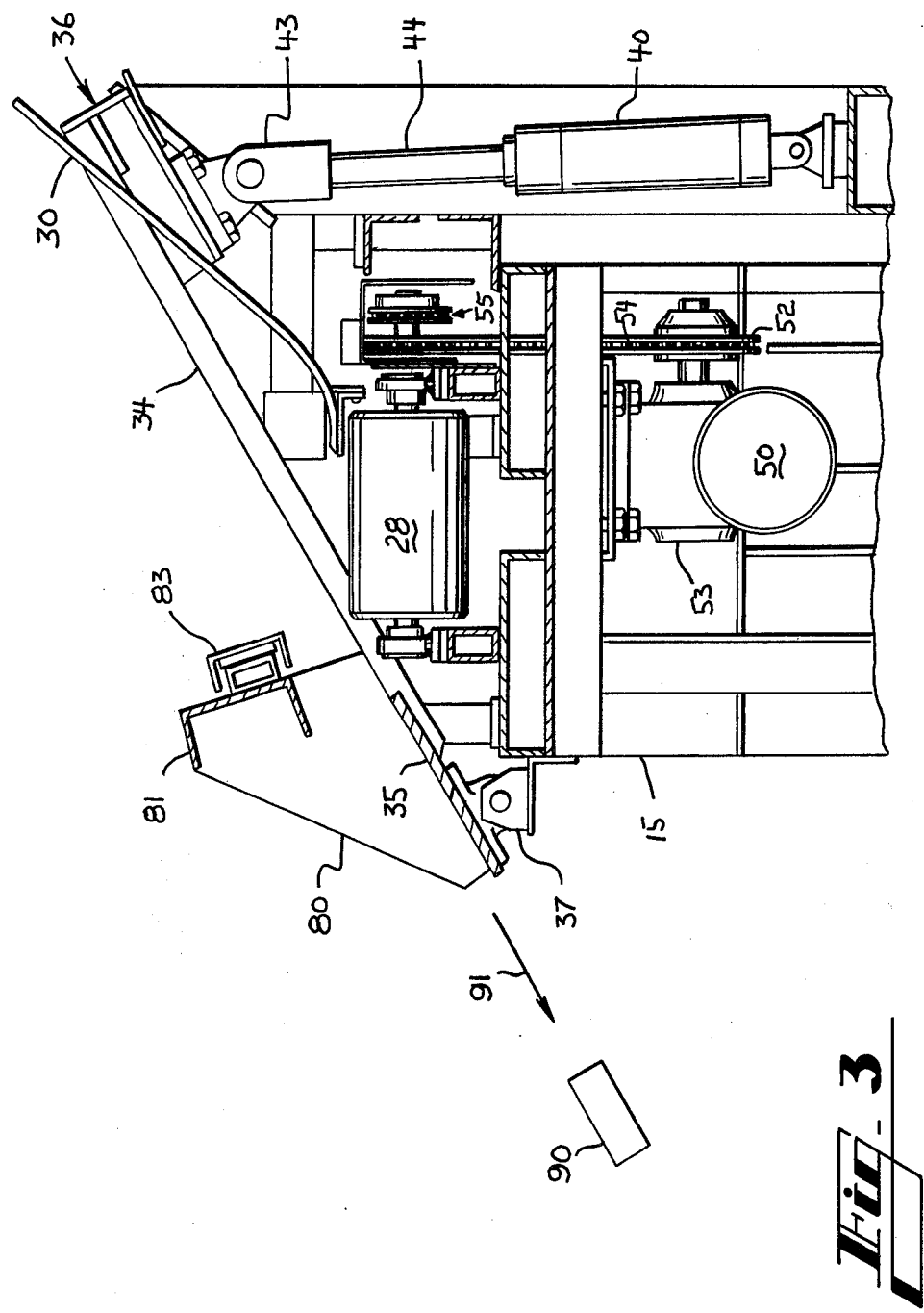
FIG. 3 is an end elevational view, partly in cross-section, of the apparatus illustrated in FIG. 1 with the article deflection bars in a bars raised position.

A motor 50 is mounted to frame 15 for driving the rollers 28 bidirectionally through a power transmission line that includes a gear box 53, a sprocket 52 and a drive chain 54. The power transmitted through the chain 54 is ultimately transmitted to the rollers 28 via a train of chains and sprockets 55 coupled with each of the rollers as shown in FIGS. 3 and 5.

Figure 4:
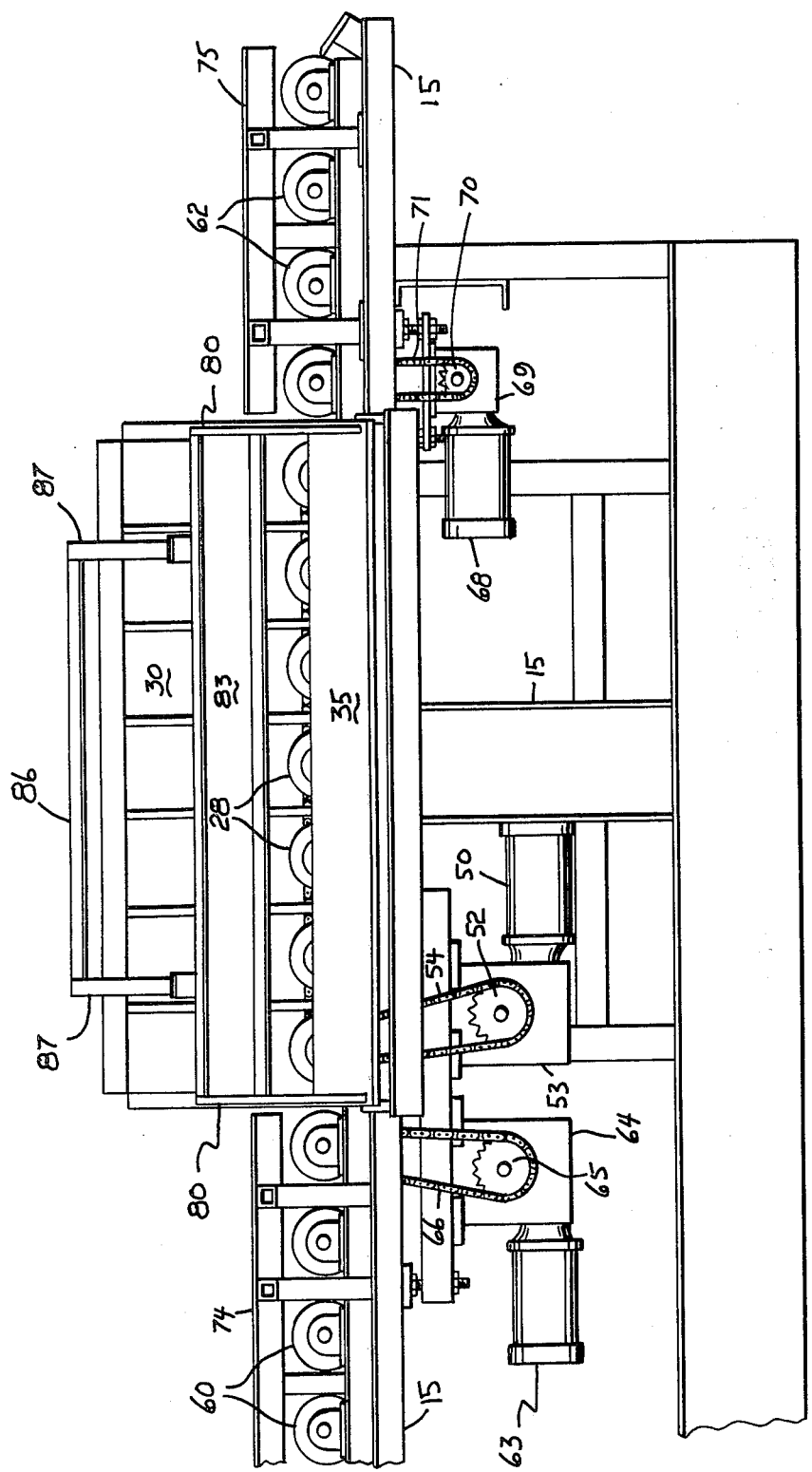
FIG. 4 is a side elevational view of the apparatus shown in FIG. 1.

To the left side of the rollers 28, as viewed in FIGS. 4 and 5, is positioned another set of rollers 60 while to the right side is positioned yet another set of rollers 62. The rollers 60 are driven counterclockwise as viewed in FIG. 4 by means of another motor 63, through a transmission train comprised of a gear box 64, a sprocket 65, a chain 66, and a series of chains and sprockets 67. The rollers 62 are driven in a clockwise direction by a motor 68, a gear box 69, a sprocket 70, a chain 71, and a power train indicated generally at 72 in FIG. 5. A pair of guide rails 74 straddles the rollers 60 while the rollers 62 are straddled by guide rails 75.

To the plate 35 at the lower end of the array of bars 34 is mounted a pair of upright side members 80 spaced at their tops by a channel member 81. A bumper bar 83 also spans the two sides members facing the ramp 30 with the bumper being resiliently backed by means of a rubber pad 84 located between the bumper and a mounting channel member 85. The bumper is mounted at a position above the plate 35 and bars 34 sufficient for an article of selected size being handled by the apparatus to slide therebeneath. If desired, a limit bar 86 may also be mounted by pendents 87 to the spanning channel member 81 in a manner to overlay the bars 34 as shown only in FIGS. 4 and 5. This limit bar serves to rotate any article such as the rectangular article 90 shown in FIG. 3 that should slide down the ramp in an upended position.

Figure 2:
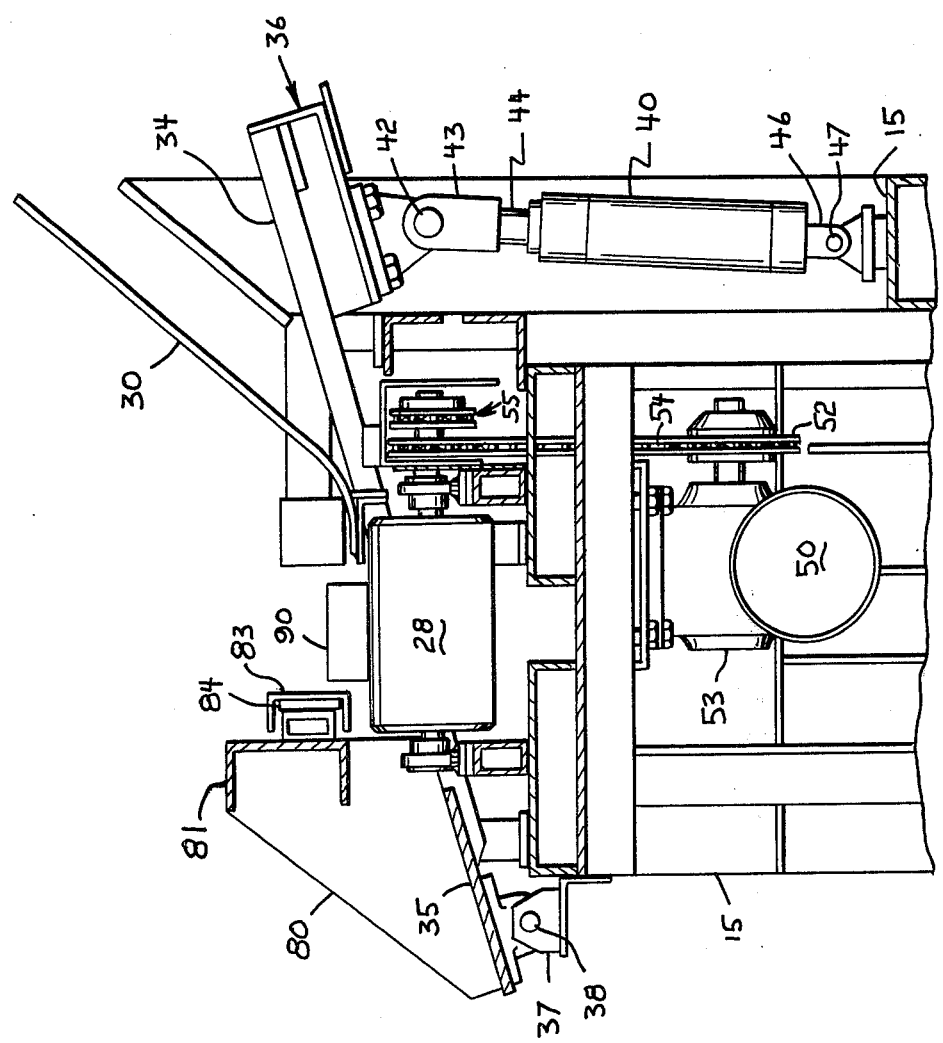
FIG. 2 is an end elevational view, partly in cross-section, of the apparatus illustrated in FIG. 1 with article deflection bars in a bars lowered position.

In operation articles such as copper rods, for one example, are successively carried up the incline of the conveyor 10 and gravity fed onto the ramp 30 with the bars 34 being in their normally lowered position as shown in FIG. 2. The articles successively slide down the ramp 30 onto the conveyor rollers 28 and strike the bumper 83 to assume the position of article 90 on the rollers as shown in FIG. 2. With the rollers 28 and 60 being driven in a counterclockwise direction, as shown in FIG. 4, the articles are then conveyed to the left onto the rollers 60 which in turn move the articles further along to the left to deliver them to an unshown deposition station. Alternatively, the rollers 28 may be rotated clockwise, as well as the rollers 62, thereby conveying the articles from beneath the ramp to the right. This is done by switching the drive output of the bidirectional motor 50 to reverse the direction of rotation of the rollers 28. Thus articles may be alternatively driven in one direction and then the other as desired to facilitate loading and unloading at the delivery stations. If desired some of the rollers 60 or 62 located distal the conveyor 26 may be made to rotate faster than the rollers proximal that conveyor in order to increase the spacing of the articles.

When desired some articles may be delivered to a third deposition site by activation of the cylinder 40 which causes the cylinder rod 44 to raise the array of bars 34 to their raised position shown in FIG. 3. In this position an article gravity fed onto the raised bars, either directly or from an upper portion of the ramp, is deflected onto the bars over the rollers 28 and beneath the bumper 83 as indicated by the arrow 91 in FIG. 3 since the bumper bar itself has also been raised by the action of raising the deflection bars. For example, should two articles be observed or detected as being too close together upon the conveyor 10, such as partially side by side, or perhaps disoriented in some manner, an observer or automatic sensor may activate the cylinder 40 raising the bars at a time before that particular article is dropped onto the ramp. As a result that article is deflected by the bars over the top of the conveyor rollers 28 beneath the bumper bar and off of the conveyor system. Following this, the cylinder 40 may be activated so as to lower the bars 34 and bumper bar 83 causing the bars to pass down through the slots of the ramp and beneath the rollers 28 whereupon the next successive article will be deposited upon the rollers 28 and conveyed either to the left or to the right as the rotary direction of the rollers 28 then dictate.

It thus is seen that apparatus for distributing articles is provided as just described. It should be understood however that this particular embodiment merely illustrates principles of the invention in one preferred form. Many modifications, additions and deletions may, of course, be made thereto without departure from the spirit and scope of the invention as set forth in the following claims.

What is claimed is:

1. Apparatus for distributing articles comprising a conveyor having a set of mutually spaced rollers; a ramp inclined upwardly from said set of mutually spaced rollers; an array of mutually spaced bars aligned between said rollers; means for raising and lowering said array of bars between a lowered position beneath said rollers and at least a lower portion of said ramp and a raised position above said rollers and said lower portion of said ramp, and means for successively gravity feeding articles onto said ramp.

2. Apparatus for distributing articles in accordance with claim 1 wherein said ramp has a set of slots aligned with said array of bars through which said bars may pass upon being raised and lowered.

3. Apparatus for distributing articles in accordance with claim 1 further comprising stop means supported upon but spaced from said array of bars a distance greater than at least one dimension of the articles for stopping articles upon said rollers upon having slid down said ramp with said array of bars in said lowered position without limiting movement of the articles upon said array of bars with said array of bars in said raised position.

4. Apparatus for distributing articles in accordance with claim 1 comprising means for driving said set of rollers bidirectionally whereby articles may be distributed in two different directions by the apparatus with the array of bars in their lowered position and in a third direction with the array of bars in their raised position.

5. Apparatus for distributing articles comprising a ramp; first conveyor means for conveying articles successively onto an upper portion of said ramp; second conveyor means comprised of a succession of mutually spaced article drive members located adjacent a lower end of said ramp for receiving articles from said ramp and for conveying articles successively away from said ramp; and deflector means comprised of a set of mutually spaced bars mounted for movement between raised and lowered positions between said second conveyor means article drive members for selectively deflecting articles from said ramp over said second conveyor means with said bars in said raised position.

6. Apparatus for distributing articles in accordance with claim 5 wherein said ramp has a set of slots aligned with said deflector means set of bars through which said bars may pass as they move between second conveyor means article drive members.

7. Apparatus for distributing articles in accordance with claim 5 comprising stop means supported on said array of bars for stopping articles upon said second conveyor article drive members with said array of bars in said lowered position.

8. Apparatus for distributing articles in accordance with claim 5 comprising means for driving said second conveyor article drive members bidirectionally whereby articles may be distributed in two different directions by the apparatus with the array of bars in their lowered position and in a third direction with the array of bars in their raised position.

* * * * *